United States Patent Office 3,413,629
Patented Nov. 26, 1968

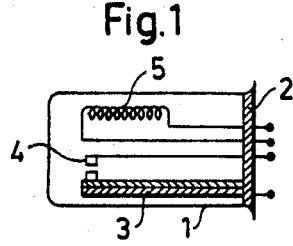
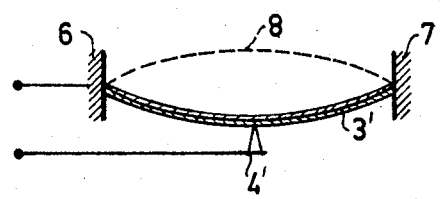
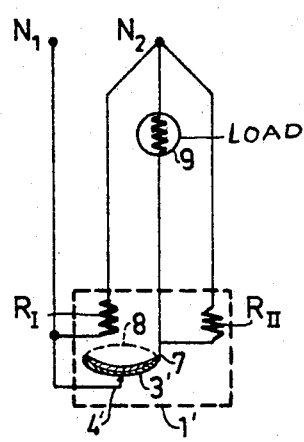
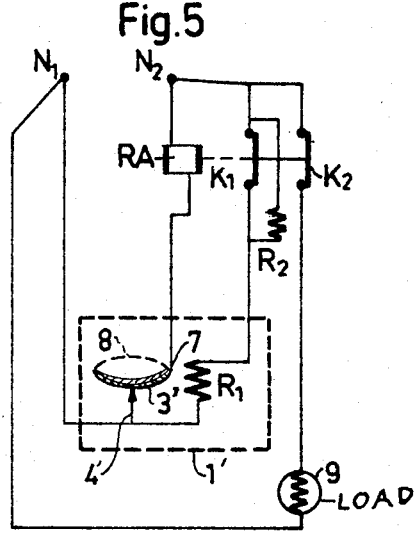
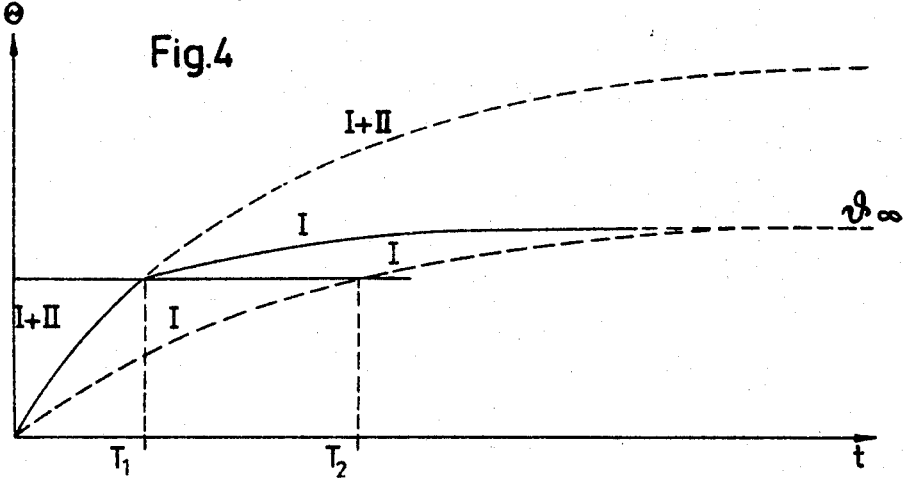

3,413,629
LIQUID LEVEL SENSING DEVICE
Jan Erik Sandgren, Perstorp, Sweden, assignor to
Aktiebolaget Flygts Pumpar, Solna, Sweden
Filed June 7, 1965, Ser. No. 461,671
Claims priority, application Sweden, June 15, 1964,
7,270/64
5 Claims. (Cl. 340—244)

ABSTRACT OF THE DISCLOSURE

A liquid level sensing and indicating device including an electrical heater and a snap action bimetallic spring carried in a casing. When the casing is submerged, heat from the heater is conducted away from the spring by the liquid. When the liquid level falls, heat from the heater causes the spring to snap to a second position which automatically lowers the rate at which heat is emitted from the heater to just maintain the spring in this second position.

The present invention relates to a sensing element or the like for indicating liquid levels, which element is intended to determine by thermal means whether liquid surrounds the sensing element or not. Said sensing element comprises at least one bimetallic spring enclosed together with at least one heat-emitting element in a casing intended to be circumcirculated by the supervised liquid, said bimetallic spring being arranged to control a signal circuit or a control circuit of a supervised apparatus such as an immersible pump, for instance.

Such sensing elements are characterized by their small size and their low price. A drawback of such known level indicators consists, however, in that they can break only low power currents and that they are comparatively sensitive to blows and shocks. Due to the insufficiency as regards their capacity to control high power currents, they must be provided with amplifying devices with the result that such level indicators become large sized and expensive. They have therefore not been used in practice to any great extent.

The present invention has for its object to avoid these drawbacks in the hitherto known level indicators and consists essentially in that the bimetallic spring of the sensing element has been internally stressed in such a way that it always assumes either one of two positions, one of them corresponding to a lower temperature of the bimetallic spring and the other one to a higher temperature of said spring, and that the heat-emitting element is so adjusted that the sensing element is heated to the point where the bimetallic spring will assume the defined position corresponding to the lower temperature when liquid surrounds the sensing element, while said spring is made to changeover under snap-action to the defined position corresponding to the higher temperature when air or gas surrounds the sensing element and vice versa. Owing to the changeover occurring under snap-action from the defined position corresponding to the lower temperature to the one corresponding to the higher temperature and vice versa, one obtains such a fast switchover of the contacts of the bimetallic spring in the control circuit or the signal circuit, that the bimetallic spring may break as well as make again currents of considerable power.

The object of the present application thus involves a simple, reliable, quick acting level indicator which may be used to control high powers.

According to an embodiment of the invention, the bimetallic spring is clamped between two stops thrusting against its ends so that it takes the shape of an arch and said spring is arranged in such a way that, when being heated in order to change over under snap-action in a position corresponding to the higher temperature, it passes through an unstable intermediate position.

The invention will be described in more detail below, reference being made to the attached drawing in which the figures show the following:

FIG. 1 an embodiment with the bimetallic spring fixed at only one of its ends,

FIG. 2 a schematically illustrated embodiment with the bimetallic spring clamped between two stops, FIG. 3 a wiring diagram for sensing element arranged to control an apparatus and provided with a bimetallic spring according to FIG. 2 as well as two resistor elements provided for heating the bimetallic spring, FIG. 4 a graph which illustrates a preferred temperature-operation curve of the sensing element, and FIG. 5 a wiring diagram for sensing element which controls an apparatus via an electromagnetic relay.

In the embodiment shown in FIG. 1, the casing 1 of the sensing element is made in the shape of an elongated metallic tube which is closed at one of its ends by means of a bottom and sealed at its other end by means of a cover 2. The bimetallic spring 3 is fixed at one of its ends in the cover 2 and provided with a conducting wire, its other end being provided with a contact, which may cooperate with an opposite, fixed contact 4, which, together with its conducting wire, is likewise fixed in the cover 2 of the tube. A heat-emitting element 5 is also fixed in the cover 2 and provided with electric terminals projecting from that cover.

FIG. 2 shows schematically a modified embodiment of the bimetallic spring arranged in the sensing element as shown in FIG. 1. While in the bimetallic spring 3 according to FIG. 1 the internal stresses for the purpose aimed at according to the invention are imparted by mechanical processing, it is envisaged that in the embodiment according to FIG. 2 the aforementioned stresses are imparted with the bimetallic spring 3' in that bimetallic spring 3' is clamped between two stops 6 and 7 thrusting against its ends. Also in this case internal stresses may possibly be imparted to the bimetallic spring 3' by mechanical processing. Also in the embodiment shown in FIG. 2 the bimetallic spring 3' is provided with a fixed, cooperating contact 4' while one of its ends, for instance at the stop, is connected to another terminal in the cover 2 of the sensing element (FIG. 1). When the bimetallic spring shown in FIG. 2 is heated by means of the heat-emitting element 5 it is also subjected to thermal stresses and when the fixed contact 4' prevents the bimetallic spring 3' from bending further out in the same direction, the bimetallic spring 3' will at a given temperature—in the following designated by $S_b$—change over under snap-action to the defined position 8, which corresponds to the higher temperature the latter being designated by $S\infty$ in the following.

The invention is thus characterized in that the bimetallic spring always assumes either one of two defined positions corresponding to different temperatures of the bimetallic spring and that the changeover between these positions occurs in relationship to the resulting stress in the bimetallic spring, which stress is a function of the temperature of said bimetallic spring, the changeover occurring under snap-action which means that a comparatively small bimetallic spring inserted in an electric circuit may break a high current. By thus combining, as described, such a bimetallic spring with a heat-emitting element in form of a resistor, one obtains a very compact and efficient level indicator which, in spite of its small dimensions, is capable of breaking comparatively high currents.

For the operations of the sensing element of the level indicator according to the present invention the relation between the excess temperature of said element above the environment temperature—designated by $\vartheta$ in the following—and the supply and abduction of heat as well as the constants of the element and of the surrounding medium are of importance.

If one assumes the heat supply to the sensing element to be Q and that all heat abduction from the element occurs by convection and radiation to the surrounding medium one obtains the following expression for the excess temperature:

$$\vartheta = \frac{\dot{Q}}{\alpha A} \cdot \left(1 - e^{\frac{\alpha A}{c \cdot m} t}\right) \qquad 1$$

where $t$ is the time $$\dot{Q} \frac{dQ}{dt}$$

$\alpha$ is the coefficient of heat transfer
A is the external surface of the element
$c$ is the specific enthalpy of the element
$m$ is mass and
$c \cdot m$ thus the calorimetric value of the element In a liquid $$\frac{Q}{\alpha A} < \vartheta_b - \vartheta amb$$

and
in air or gas $$\frac{Q}{\alpha A} > \vartheta_b - \vartheta amb$$

The significance of the above expression can best be ilustrated in an account referring to the graph shown in FIG. 4 which is an illustration of the operation according to the present invention of the embodiment shown in FIG. 3.

According to said embodiment of FIG. 3 the bimetallic spring 3' is arranged as shown in FIG. 2, and is, in one of its positions, connected via a contact 4' to one of the terminals $N_1$ of the main power supply. One of the clamping points 7 of the bimetallic spring 3' is connected to the other terminal $N_2$ of the mains via the apparatus or load 9, such as an immersible pump, which is to be controlled. The casing 1' of the sensing element is indicated by a broken rectangle. Within said rectangle, in the embodiment shown, are arranged two resistors $R_I$ and $R_{II}$, of which the latter is shunted across the control apparatus whilst the former is shunted across both the bimetallic spring and said control apparatus 9.

The purpose of the double resistors will now be explained more in detail, reference being made to the graph according to FIG. 4. In said graph the variation of the excess temperature $\vartheta$ is represented as a function of the time in a system of coordinates with the temperature Q of the sensing element as ordinate and the time $t$ as abscissa. The curve I+II which consists of a continuous line and a broken line thus constitutes the graphic representation of the above Formula 1, the heat supply Q being provided by the resistors $R_I$ and $R_{II}$.

In order to protect the bimetallic spring against too high a temperature, the value $$\vartheta \infty = \frac{Q}{\alpha A}$$

(i.e. the temperature of the element in the state of equilibrium) should not exceed by too much the value of $\vartheta_b$. This implies, however—as appears in FIG. 4—from the difference in the time $T_2-T_1$ between the moment $T_2$ while, according to the curve I the temperature $\vartheta_b$ is reached when only one resistor $R_1$ in the sensing element is used and the moment $T_1$, at which, according to the curve I+II, said temperature $\vartheta_b$ is reached, when both resistors $R_I$ and $R_{II}$ are used—that a considerable period of time elapses before the device responds, which in many cases implies a substantial drawback. The first part of the curve I+II, which corresponds to the use of both resistors $R_I$ and $R_{II}$, discloses a method in trying to influence $\vartheta$ by varying the heat supply Q at the same time as the bimetallic spring responds. This effect is thus the purpose of the twin resistors used in the embodiment shown in FIG. 3.

In order to reduce the response time of the device, one may, possibly in combination with the above measure, have recourse to any of the following measures. One may either make the quotient $\alpha A/c \cdot m$ as great as possible, for instance by providing the sensing element with cooling fins, or one may change the surface of said element, for instance by painting it, so as to increase the $\alpha$-value.

By the above measures one obtains a value of $\vartheta \infty$ which does not exceed by too much the value $\vartheta_b$ as appears from the second continuous curve part 1 in FIG. 4, which joins the first plain curve part I+II.

The reason why one may let the heat supply Q vary at the same time as the bimetallic spring responds is that the coefficient of heat transfer varies so much with the surrounding medium that one may allow a comparatively high power when liquid surrounds the sensing element without the temperature of the bimetallic spring reaching the changeover temperature $\vartheta_b$.

A variation of the heat supply Q may also be obtained by means of an embodiment of the invention of the kind shown in FIG. 5. In this case the sensing element 1' is arranged in the same way as in the embodiment according to FIG. 3 but with the difference that only one resistor $R_1$ is provided in the sensing element while the second resistor $R_2$ is located outside the sensing element and inserted between the latter and one of the terminals $N_2$ of the mains. The other terminal $N_1$ of the mains is connected to the fixed contact 4' of the bimetallic spring 3. One of the clamping points 7 of the bimetallic spring is connected to the terminal $N_2$ of the mains by a power winding of a relay RA. A make contact $K_1$ of the relay RA shunts the resistor $R_2$ when the relay RA is energized and a second make contact $K_2$ of said relay connects the apparatus 9 controlled by the sensing element to the mains when the relay is energized.

Also with this arrangement one obtains a variation of the heat supply Q in that the resistor $R_2$ is disconnected when the bimetallic spring snaps over to its other position 8 as appears from a comparison between the generated powers when one or two resistors are inserted in the resistor circuit. The power $P_1$ generated in the resistor $R_1$ is $$P_1 = \frac{V^2}{R_1}$$

while the power generated when both resistors are connected in series is $$P_2 = \frac{V}{R_1 + 2R_2 + \frac{R_2^2}{R_1}}$$

As appears from the above, $P_2 < P_1$.

Although the invention has been described with reference to a couple of embodiments of said invention, it may however, be modified at discretion within the scope of the following claims.

What I claim is:
1. Apparatus comprising, a control circuit; a casing; an electrically conductive bimetallic contact spring adapted to make and break said control circuit carried within said casing and adapted to always assume either a first position in response to a low temperature of said spring or a second position in response to a higher temperature of said spring, the spring being switched between said positions by snap action; a heat source carried by said casing and adapted to emit heat at a first rate not great enough to raise the temperature of said spring sufficiently to cause it to assume its said second position when liquid surrounds said casing but great enough to raise the temperature of said spring sufficiently to cause it to assume its said second position when the liquid level falls below said casing; and means responsive to said spring being moved to its second position for changing the rate at which said heat source emits heat to a second value greater than zero.

2. Apparatus as defined in claim 1 wherein said second value of heat emission is lower than said first value of heat emission but great enough to keep said spring in its second position when the liquid level is below said casing.

3. Apparatus as defined in claim 2 wherein said second value of heat emission is just great enough to keep said spring in its second position when the liquid level is below said casing.

4. Apparatus as defined in claim 6 wherein said heat source comprises a pair of resistors, one of which is constantly connected to a voltage source and the other which is connected to a voltage source only when said spring is in its first position.

5. Apparatus as defined in claim 1 wherein said heat source comprises a resistor through which current is passed, said current having one non-zero value when said spring is in its first position and another non-zero value when said spring is in its second position.

References Cited

UNITED STATES PATENTS

| | | | |
|---|---|---|---|
| 2,619,566 | 11/1952 | Mahoney | 340—244 XR |
| 3,118,136 | 1/1964 | Steele | 340—244 |
| 3,152,554 | 10/1964 | Kofink | 200—138.3 XR |
| 3,259,763 | 7/1966 | Appleton | 200—138.3 XR |

JOHN W. CALDWELL, *Primary Examiner.*

D. MYER, *Assistant Examiner.*